2 Sheets—Sheet 1.
W. G. RHOADS.
Water-Closet.
No. 203,071.  Patented April 30, 1878.
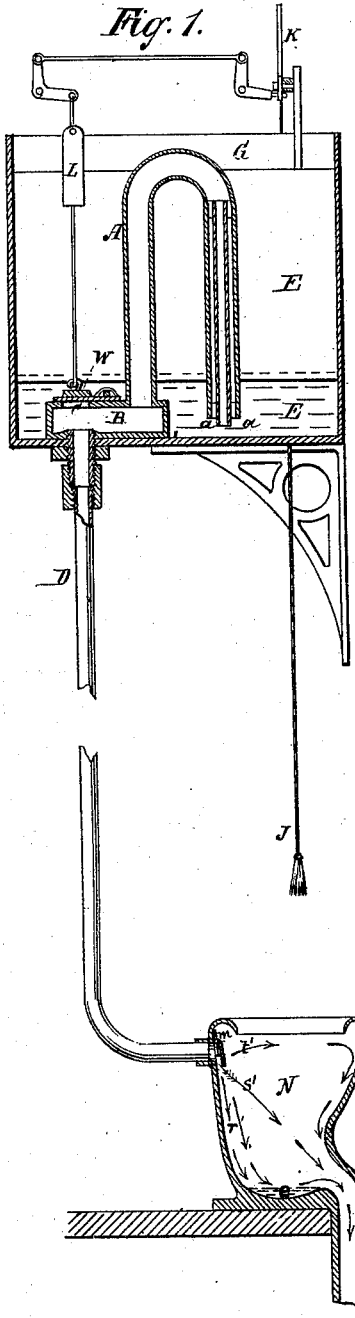
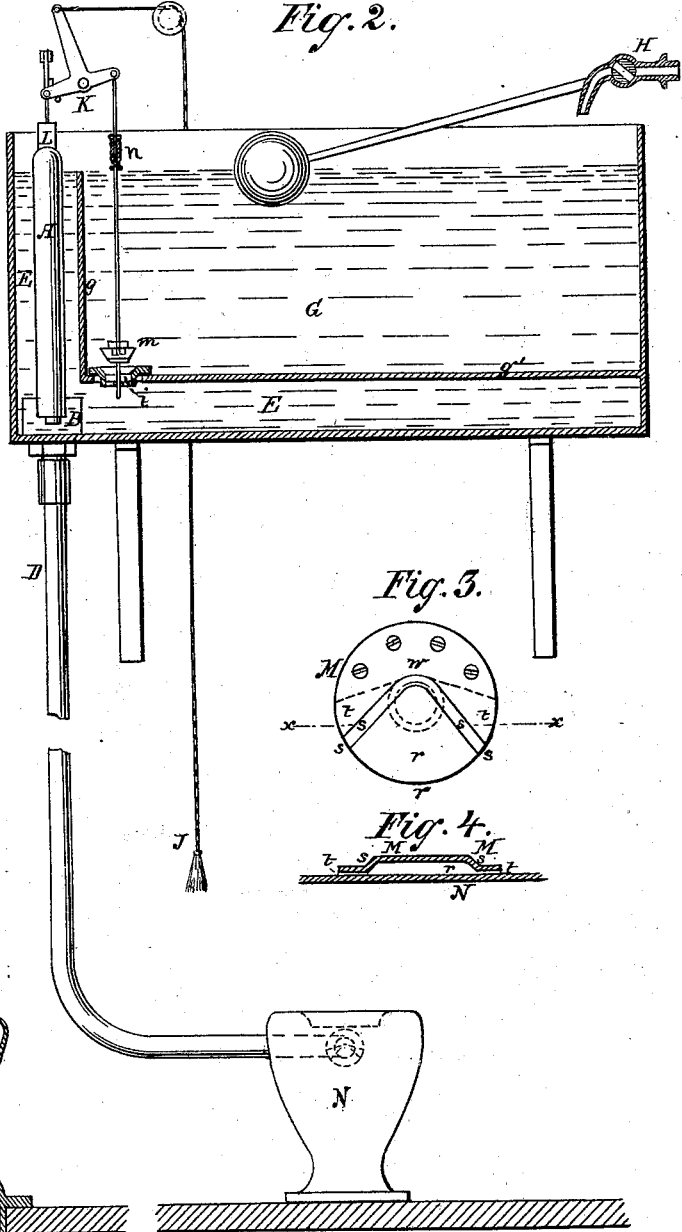

2 Sheets—Sheet 2.

W. G. RHOADS.
Water-Closet.

No. 203,071. Patented April 30, 1878.

Witnesses:
Chas. Roehrig.
Geo. J. Smith

Inventor:
William G. Rhoads
By David A. Burr
Atty.

N. PETERS, PHOTO-LITHOGRAPHER, WASHINGTON, D.C.

UNITED STATES PATENT OFFICE.

WILLIAM G. RHOADS, OF PHILADELPHIA, PENNSYLVANIA.

IMPROVEMENT IN WATER-CLOSETS.

Specification forming part of Letters Patent No. 203,071, dated April 30, 1878; application filed March 18, 1878.

*To all whom it may concern:*

Be it known that I, WILLIAM G. RHOADS, of the city and county of Philadelphia, and State of Pennsylvania, have invented new and useful Improvements in Water-Closets, of which the following is a specification:

The invention relates to cistern water-closets and devices for flushing the same.

It consists in the construction of a siphon with a lateral or an annular aperture in its longer leg, to be opened for the purpose of starting the siphon by an admission of water thereto, and to be closed to complete its action; and in the combination of this improved siphon with the service-box or cistern of a water-closet, for the purpose of producing, periodically or otherwise, as may be desired, the sudden discharge into the closet of the entire volume of water contained in the box, and to carry off likewise any excess of water flowing into the cistern after it is full.

It consists, also, in the combination of air-vents with the siphon, to prevent the noise usually attendant upon the reflow of water out of its shorter leg when the water level has reached its mouth; and, furthermore, in the combination of a regulating valve or plug with the supply-opening between the reservoir and siphon service-box, to permit a ready adjustment of the quantity of water to be delivered by the siphon at each discharge.

It consists, finally, in the combination, with the siphon and with the closet-hopper to be flushed by its action, of an improved form of distributing plate or fan adapted to secure an effective distribution within the hopper of the flood of water discharged by the siphon.

The object of my invention is to provide a very simple apparatus for producing effectively and noiselessly a thorough cleansing of the hopper or bowl of a water-closet by suddenly flushing the same, either at will or intermittently, at stated intervals, with a measured volume of water, to be easily determined, and varied as required, and which shall be delivered in a full, solid body, undisturbed by any admixture of air, and to so distribute this flow of water in its discharge into the hopper as that it shall operate most efficiently where most needed, and thoroughly cleanse the whole.

Figure 6:
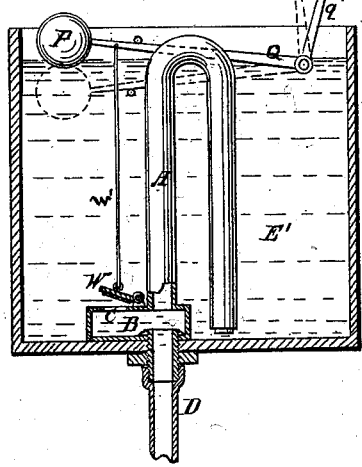
Figure 7:
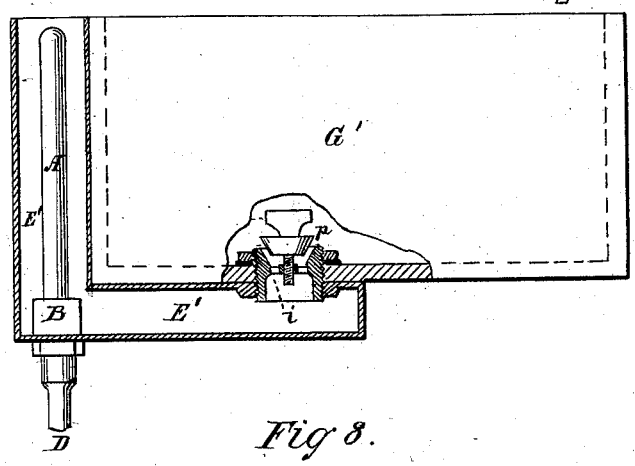
Figure 9:
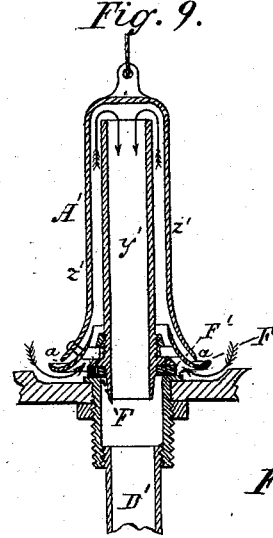
Figure 8:
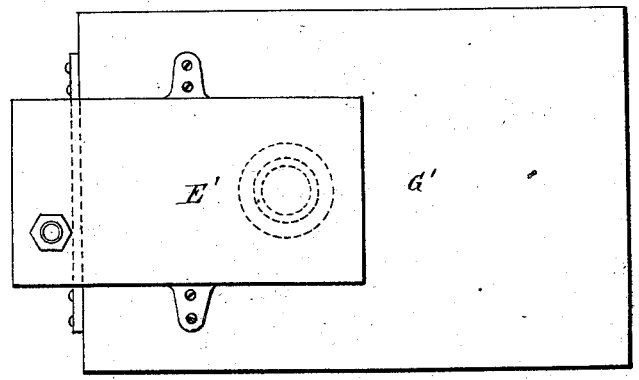
Figure 10:
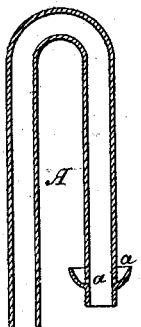
Figure 5:
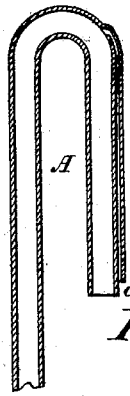

In the accompanying drawings, Figure 1 is a sectional view, illustrating my improved valved siphon constructed with a lateral opening and valve, and combined with the service-box and tank and with the service-pipe and fan of a Rhoads' patent porcelain-seated water-closet hopper. Fig. 2 is a similar section at right angles to that in Fig. 1, illustrating more fully the combination and arrangement of the service-box and tank with reference to the siphon, whereby the latter is made to subserve the purpose of an overflow-pipe. Fig. 3 is an elevation, and Fig. 4 a transverse section in line $x\ x$ of Fig. 3, illustrating the construction of the improved distributing-fan. Figs. 5 and 10 illustrate modifications in the combination of air-inlets with the siphon. Fig. 6 illustrates the combination of a float, lever, and shifting weight with my improved valved siphon to secure its automatic intermittent action. Fig. 7 is an elevation, partly in section, illustrating a modification in the construction and arrangement of service-box and tank for use in combination with my valved siphon, and also the combination, with the tank and siphon service-box, of a regulating-plug to regulate and control the feed-aperture between the two. Fig. 8 is a bottom view of service-box and tank shown in Fig. 7, and Fig. 9 is a sectional view of my improved siphon when constructed in a concentric form and with an annular opening and joint in combination with its longer leg and discharge-pipe.

Similar letters indicate like parts in all of the figures.

A, Figs. 1 and 6, is a siphon, constructed with an offset, B, in its longer leg, to furnish a seat for a valve, W, covering an opening, C, into the siphon. A discharge-pipe, D, is so connected with said offset B, either beneath the valve-opening C, Fig. 1, or immediately under the leg of the siphon, Fig. 6, as to form an effective extension or continuation of the latter when the valve-opening is closed. The valved siphon A is placed wholly within a suitable service-box, E, for use, its longer leg or connected discharge-pipe D being carried through the bottom of the box with a water-tight joint.

An annular opening may be substituted as an equivalent for the lateral opening C by forming a joint, F, (see Fig. 9,) in the longer leg of the siphon or between its lower end and the upper end of a discharge-pipe, D', projecting within the tank or vessel containing the siphon, the joint being so constructed as to be water-tight when closed, and to be opened by simply lifting the siphon from its seat.

A concentric siphon, A', Fig. 9, having its longer leg, $y'$, encircled and covered by its shorter leg, $z'$, is preferable, because of its compactness and facility of movement, for use in connection with an annular opening and joint, F.

The joint at F is made water-tight, when closed, by means of a suitable packing-ring or valve, F', properly supported and secured about the lower end of the leg $y'$ of the siphon, as shown in Fig. 9, and which fits down upon a suitable annular seat formed upon or fitted to the upper end of the discharge-pipe D'. I comtemplate, likewise, forming the joint at F with a hinge-connection, so that the joint shall be closed water-tight when the siphon is upright, but open when the siphon is tipped from its normal vertical position.

The service-box E E', Figs. 1, 2, 6, and 7, designed for use in connection with my improved siphon for the flushing of water-closets and urinals, is made of comparatively small capacity, and, for the sake of compactness, is of an angular or L form, so that one arm may extend under the larger supply-tank or reservoir G and the other arm project up at one side or end of the tank to its top edge. (See Fig. 7.) This L-shaped service-box may be constructed in one with the tank G by fitting a suitable partition and false bottom, $g g'$, in the latter, as shown in Fig. 2; or it may be separately formed of cast-iron, and be fitted to and connected with an ordinary wooden lead-lined tank, G', as shown in Figs. 7 and 8.

The valved siphon A or A' is placed in the upright chamber of the service-box E, and is made of such length relatively thereto as that its return-bend shall extend nearly to the top of the box and its shorter leg nearly to the bottom thereof when properly adjusted and secured in position. Its capacity is made to exceed that of the water-supply pipe H, so that when the level of the water delivered into the tank from the supply-pipe has reached the bend of the siphon any further supply will overflow through the siphon.

Communication is established between the supply-tank or reservoir G and the service-box E by means of an aperture, $i$, of smaller capacity than that of the siphon.

The siphon A, Fig. 1, is charged and brought into action at the pleasure of the person using the water-closet by means of a cord or pull, J, operating, through the intervention of suitable crank-connections, to raise the valve W, and thus admit a flow of water into the longer leg of the siphon. The discharge of this water through the long leg of the siphon and its discharge-pipe will, so soon as the opening therein is closed, produce a current through the siphon, which, being thus brought into action, will continue to flow until the water in the service-box is all exhausted. The valve formed by the packing-ring F' about the lower end of the siphon A', Fig. 9, to close the annular opening or joint F therein, is opened by lifting the siphon itself; and this may be effected in same manner, by same means, and with the same result as in case of the valve W, Fig. 1, the one form of valved siphon, A', being an equivalent of the other, A.

To prevent a possibility of a waste of water, because of a holding open of the siphon-valve W or F' after the service-box is exhausted, the feed-opening $i$, between the tank G and service-box E, may be fitted with a valve, $m$, to be operated by a T-lever, which shall also operate the siphon-valve, as shown in Figs. 1 and 2, so that when the siphon-valve is opened the feed-opening $i$ shall be closed, and vice versa. The proper return movement of the T-lever K to close the valve W when the pull J is released is insured by means of a weight, L, Fig. 1, placed over the valve W. As the quantity of water discharged by the siphon each time that it is brought into action will depend not only upon the size of the service-box and its elevation above the closet, but also upon the size of the feed-opening between the two tanks, through which a stream will constantly flow while the siphon is in play, the play of the valve $m$, closing said opening $i$, Fig. 2, is made adjustable relatively to the movement of the lever K (which is defined and limited by suitable stops) by means of a right and left nut, $n$, covering a joint in the valve-rod, which, by producing a variation in the length of the valve-rod, will determine the extent to which the valve may open, and consequently the amount of water which may pass to the siphon for discharge, in addition to the water contained in the service-box.

Where it is not deemed necessary to guard against waste by closing the opening $i$ when the siphon-valve is opened, the size of the feed-opening is adjusted and enlarged or diminished, as required, by means of a taper-plug, $p$, Fig. 7, arranged to screw up or down to or from a conical seat encircling the feed-opening.

My improved valved siphon is adapted for use specially in combination with that form of my porcelain-seated water-closet hopper (patented October 23, 1877) in which a bowl, $e$, Fig. 1, is formed in one piece with the hopper, directly beneath the seat-opening, and with the soil-pipe connection in front thereof, as illustrated in the lower section of Fig. 1 of the drawings, the combination of the siphon and its discharge-pipe with the hopper N being in such case made effective by means of a novel form of distributing-fan or inlet-plate, M. (See Figs. 3 and 4.) This plate M may be circular in form. Its upper section $w$ is adapted to fit against the inner side of the hopper N over its inlet-port, so as to make a close joint therewith. Its lower section consists of a segmental recess, $r$, (see Figs. 3 and 4,) which, beginning at a point sufficiently far above the center to cover and embrace, when in place, the mouth of the inlet-port of the hopper, is bounded by radial, flaring, or beveled shoulders $s\ s$ and shallow recesses $t\ t$, forming extensions of the recess $r$, and which terminate at diametrically opposite points in the circumference of the plate. (See dotted lines, Fig. 3.) These recesses $r$ and $t\ t$ are so proportioned as that the central recess $r$ shall embrace an arc of about twice the extent, and be of a depth about three times as great as said flanking recesses $t\ t$, the capacity of the entire opening left between the recessed portion of the plate M and the side of the hopper, when the plate is properly secured in place, being about equal to that of the inlet-port over which it is fitted.

The effect and operation of this improved distributing fan or plate M are illustrated by the arrows in the hopper N, Fig. 1, $r'$ illustrating the course of the main volume of water discharged through the recess $r$, $s'$ the direction of the currents directed by the flaring shoulders $s$, and $t'$ the direction given to the lesser streams of water passing through the narrow spaces $t\ t$. The heavy current, falling directly from the recess $r$, floods and washes the bowl $e$ of the hopper with sufficient force and power to carry before it all solid matter therein contained, while the finer streams, diverted around the sides, wash out the whole interior surface.

For the water-closets and urinals of hospitals, hotels, and other public places, and for drains and sewers where frequent flushing is required, the siphon A or A' is brought into action automatically at regular intervals by means of a float, P, Fig. 6, at the end of a bent lever, Q, pivoted so that its shorter arm $q'$ shall project upward.

The pivot of the lever is so placed with reference to the bend of the siphon A as that, when the water-level has nearly reached the bend, the float carrying the longer arm of the lever shall bring it to a horizontal plane and throw its shorter upright arm $q'$ into a vertical plane over its pivot. The shorter arm $q'$ is, however, weighted at its end, so that so soon as it has been carried over and past the center by the lifting of the float P its gravity will instantly counterbalance and lift the float far enough to open the valve W (see Fig. 6) in the siphon A, the valve and float-arm being connected for this purpose by means of a suitable cord or chain, W'.

The weight of the float P is so proportioned to that of the weight on the lever-arm $q'$ as that, when the float is left unsupported by the water, it will more than counterbalance said weight, and thus cause the long arm of the lever to drop far enough to allow the valve W to close, a farther movement being prevented by a suitable stop. When the valve W is closed, the siphon, brought into action by the descending column of water in the discharge-pipe, will continue to play until the tank is emptied. The length of the interval between each discharge of the tank by the siphon may be regulated at pleasure by regulating the size of the stream supplying the tank, the discharge being regularly effected as often as the tank becomes full.

To prevent the loud gurgling noise usually attendant upon the indraft of air in opposition to the reflow of the water out of the shorter leg of the siphon when its mouth begins to be uncovered, and its action consequently is about to cease because of the depression of the water-level following its action, I combine apertures or ducts $a\ a$ with the shorter leg of the siphon, which shall serve to admit a comparatively small quantity of air thereinto before its mouth is entirely uncovered, and thus allow the water-column therein to fall without resistance from an inflow of air at the mouth. This independent air-supply may be obtained by means of a concentric tube inserted within the shorter leg of the siphon, to project slightly below it, as shown in Fig. 1; or by a small external tube fitted without, and extending upward from near the mouth of the short leg, to communicate with the bend of the siphon, as shown in Fig. 5; or by means of a simple opening in the siphon formed a little above its mouth, as shown in Fig. 10.

I contemplate the substitution of a rolling weight as a mechanical equivalent for the weighted vibrating arm $q'$, Fig. 6, for the purpose of counterbalancing and tilting the float P, to lift the valve W, as described.

I claim as my invention—

1. The combination of a siphon with the discharge-pipe of a tank or vessel, and with an intervening aperture, which affords, when open, direct communication between the pipe and tank, and, when closed, converts the pipe into an extension of the siphon, all substantially as and for the purpose herein set forth.

2. The combination, with the long leg of a siphon, of an annular or lateral opening therein, governed by a suitable joint or valve, and which, when closed, shall serve to perfect and lengthen the siphon, substantially in the manner and for the purpose herein set forth.

3. The combination of air-passages $a\ a$ with the shorter leg of a siphon, to permit an inflow of air to its bend before the mouth of the siphon is uncovered when in action, substantially as and for the purpose herein set forth.

4. The combination, with separate yet communicating tanks E G, and with a supply-pipe, H, feeding the one, of a siphon, A, so connected with the other as that its return-bend shall fall below the highest fluid-level desired therein, and whose discharging capacity shall exceed that of the opening or openings between the tanks, all substantially as and for the purpose herein set forth.

5. The combination, with the siphon A, service-box E, and reservoir G, of an adjustable valve or plug controlling an opening, $i$, between the reservoir and service-box, and operating to regulate and determine, by its adjustment, the volume of water to be discharged by the siphon when in action, all substantially as and for the purpose herein set forth.

6. The combination, with the siphon A, pipe D, and water-closet hopper N, of the distributing-fan M, having upon its under face a segmental depression, $r$, flanked by the radial flaring or beveled shoulders $s\ s$ and lesser radial depressions $t\ t$, to control and direct the inflow of water into the hopper, substantially in the manner and for the purpose herein set forth.

W. G. RHOADS.

Witnesses:
ROBT. G. LOUGHERY,
W. D. ALLEN.